United States Patent
Phillips et al.

(10) Patent No.: US 10,730,531 B1
(45) Date of Patent: Aug. 4, 2020

(54) MACHINE-LEARNING BASED VEHICLE MOTION CONTROL SYSTEM

(71) Applicant: UATC, LLC, San Francisco, CA (US)

(72) Inventors: Michael L. Phillips, Pittsburg, PA (US); David M. Bradley, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 230 days.

(21) Appl. No.: 15/423,215

(22) Filed: Feb. 2, 2017

(51) Int. Cl.
| | |
|---|---|
| *B60W 60/00* | (2020.01) |
| *G06N 20/00* | (2019.01) |
| *G05D 1/00* | (2006.01) |
| *G08G 1/16* | (2006.01) |

(52) U.S. Cl.
CPC ....... *B60W 60/0011* (2020.02); *G05D 1/0088* (2013.01); *G06N 20/00* (2019.01); *G08G 1/166* (2013.01); *B60W 2554/4026* (2020.02); *B60W 2554/80* (2020.02); *G05D 2201/0213* (2013.01)

(58) Field of Classification Search
CPC ........ B60W 60/0011; B60W 2554/80; B60W 2554/4026; G06N 20/00; G08G 1/166; G05D 1/0088; G05D 2201/0213
See application file for complete search history.

(56) References Cited

U.S. PATENT DOCUMENTS

| | | | | |
|---|---|---|---|---|
| 8,457,827 | B1 * | 6/2013 | Ferguson | G05D 1/00 |
| | | | | 701/23 |
| 8,660,734 | B2 * | 2/2014 | Zhu | G06T 7/223 |
| | | | | 701/23 |
| 8,948,954 | B1 * | 2/2015 | Ferguson | B60W 30/12 |
| | | | | 701/23 |
| 8,948,955 | B2 * | 2/2015 | Zhu | G06T 7/223 |
| | | | | 701/23 |
| 9,330,571 | B2 * | 5/2016 | Ferguson | G05D 1/00 |
| 9,381,916 | B1 * | 7/2016 | Zhu | B60W 30/0956 |
| 9,495,874 | B1 * | 11/2016 | Zhu | G06N 3/00 |
| 9,568,915 | B1 * | 2/2017 | Berntorp | B60W 30/00 |
| 9,604,639 | B2 * | 3/2017 | Laur | B60W 30/0953 |
| 9,632,502 | B1 * | 4/2017 | Levinson | G01S 7/4972 |
| 9,701,306 | B2 * | 7/2017 | Prokhorov | B60W 30/09 |
| 9,720,415 | B2 * | 8/2017 | Levinson | G01S 17/42 |
| 9,764,468 | B2 * | 9/2017 | Izhikevich | B25J 9/163 |
| 9,764,736 | B2 * | 9/2017 | Prokhorov | B60W 30/0953 |
| 9,932,038 | B1 * | 4/2018 | Zhu | H05K 999/99 |
| 9,950,708 | B1 * | 4/2018 | Cullinane | B60W 30/095 |
| 10,013,773 | B1 * | 7/2018 | Ogale | G06T 7/73 |

(Continued)

*Primary Examiner* — Peter D Nolan

(74) *Attorney, Agent, or Firm* — Dority & Manning, P.A.

(57) ABSTRACT

Systems and methods for controlling the motion of an autonomous are provided. In one example embodiment, a method includes obtaining, by one or more computing devices on-board an autonomous vehicle, state data descriptive of a current state of an object that is proximate to the autonomous vehicle. The method includes determining, by the one or more computing devices, one or more features associated with the object based at least in part on the state data. The method includes determining, by the one or more computing devise, a vehicle action for the autonomous vehicle based at least in part on a machine-learned model and the one or more features associated with the object. The vehicle action includes stopping a motion of the autonomous vehicle or moving the autonomous vehicle past the object.

20 Claims, 7 Drawing Sheets

(56) References Cited

U.S. PATENT DOCUMENTS

| | | | |
|---|---|---|---|
| 2012/0083960 A1* | 4/2012 | Zhu | G05D 1/0055 |
| | | | 701/23 |
| 2014/0136045 A1* | 5/2014 | Zhu | G05D 1/0214 |
| | | | 701/23 |
| 2014/0142799 A1* | 5/2014 | Ferguson | G05D 1/00 |
| | | | 701/23 |
| 2014/0277718 A1* | 9/2014 | Izhikevich | B25J 9/163 |
| | | | 700/250 |
| 2016/0176398 A1* | 6/2016 | Prokhorov | B60W 30/09 |
| | | | 701/23 |
| 2017/0043768 A1* | 2/2017 | Prokhorov | B60W 30/0953 |
| 2017/0057497 A1* | 3/2017 | Laur | B60W 30/0953 |
| 2017/0123419 A1* | 5/2017 | Levinson | G01S 7/4972 |
| 2017/0123429 A1* | 5/2017 | Levinson | G05D 1/0088 |
| 2018/0012492 A1* | 1/2018 | Baldwin | B60T 7/00 |
| 2018/0068206 A1* | 3/2018 | Pollach | G06K 9/00791 |
| 2018/0074493 A1* | 3/2018 | Prokhorov | G05D 1/0088 |
| 2018/0127000 A1* | 5/2018 | Jiang | B60W 40/09 |
| 2018/0136652 A1* | 5/2018 | Jiang | G05D 1/0088 |

* cited by examiner

MACHINE-LEARNING BASED VEHICLE MOTION CONTROL SYSTEM

FIELD

The present disclosure relates generally to using machine-learned model(s) to improve the motion control of an autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

Thus, a key objective associated with an autonomous vehicle is the ability to perceive the location of objects that are proximate to the autonomous vehicle and, further, to predict or otherwise understand where such object will be in the near future (e.g., the next one to ten seconds). The ability to accurately and precisely predict the future locations of objects is fundamental to enabling the autonomous vehicle to generate an appropriate motion plan through its surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of controlling the motion of an autonomous vehicle. The method includes obtaining, by one or more computing devices on-board an autonomous vehicle, state data descriptive of a current state of an object that is proximate to the autonomous vehicle. The method includes determining, by the one or more computing devices, one or more features associated with the object based at least in part on the state data. The method includes determining, by the one or more computing devise, a vehicle action for the autonomous vehicle based at least in part on a machine-learned model and the one or more features associated with the object. The vehicle action includes stopping a motion of the autonomous vehicle or moving the autonomous vehicle past the object.

Another example aspect of the present disclosure is directed to a computing system for controlling the motion of an autonomous vehicle. The computing system includes one or more processors on-board an autonomous vehicle and one or more memory devices on-board the autonomous vehicle. The one or more memory devices store instructions that when executed by the one or more processors cause the computing system to perform operations. The operations include obtaining state data descriptive of a current state of an object that is proximate to the autonomous vehicle. The operations include determining one or more features associated with the object based at least in part on the state data. The operations include inputting the one or more features associated with the object into a machine-learned model. The operations include receiving data indicative of a vehicle action as an output of the machine-learned model. The vehicle action includes stopping a motion of the autonomous vehicle or moving the autonomous vehicle past the object.

Yet another example aspect of the present disclosure is directed to an autonomous vehicle. The autonomous vehicle includes a machine-learned model that has been trained to determine a vehicle action based at least in part on one or more features associated with an object that is proximate to the autonomous vehicle. The autonomous vehicle includes one or more processors and one or more non-transitory computer-readable media that collectively store instructions that, when executed by the one or more processors, cause the one or more processors to perform operations. The operations include obtaining state data descriptive of a current state of the object that is proximate to the autonomous vehicle. The operations include determining the one or more features associated with the object based at least in part on the state data descriptive of the current state of the object that is proximate to the autonomous vehicle. The operations include inputting the one or more features associated with the object into the machine-learned model. The operations include receiving, as an output of the machine-learned model, data indicative of the vehicle action.

Other example aspects of the present disclosure are directed to systems, methods, vehicles, apparatuses, tangible, non-transitory computer-readable media, user interfaces, and memory devices for controlling the motion of an autonomous vehicle.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
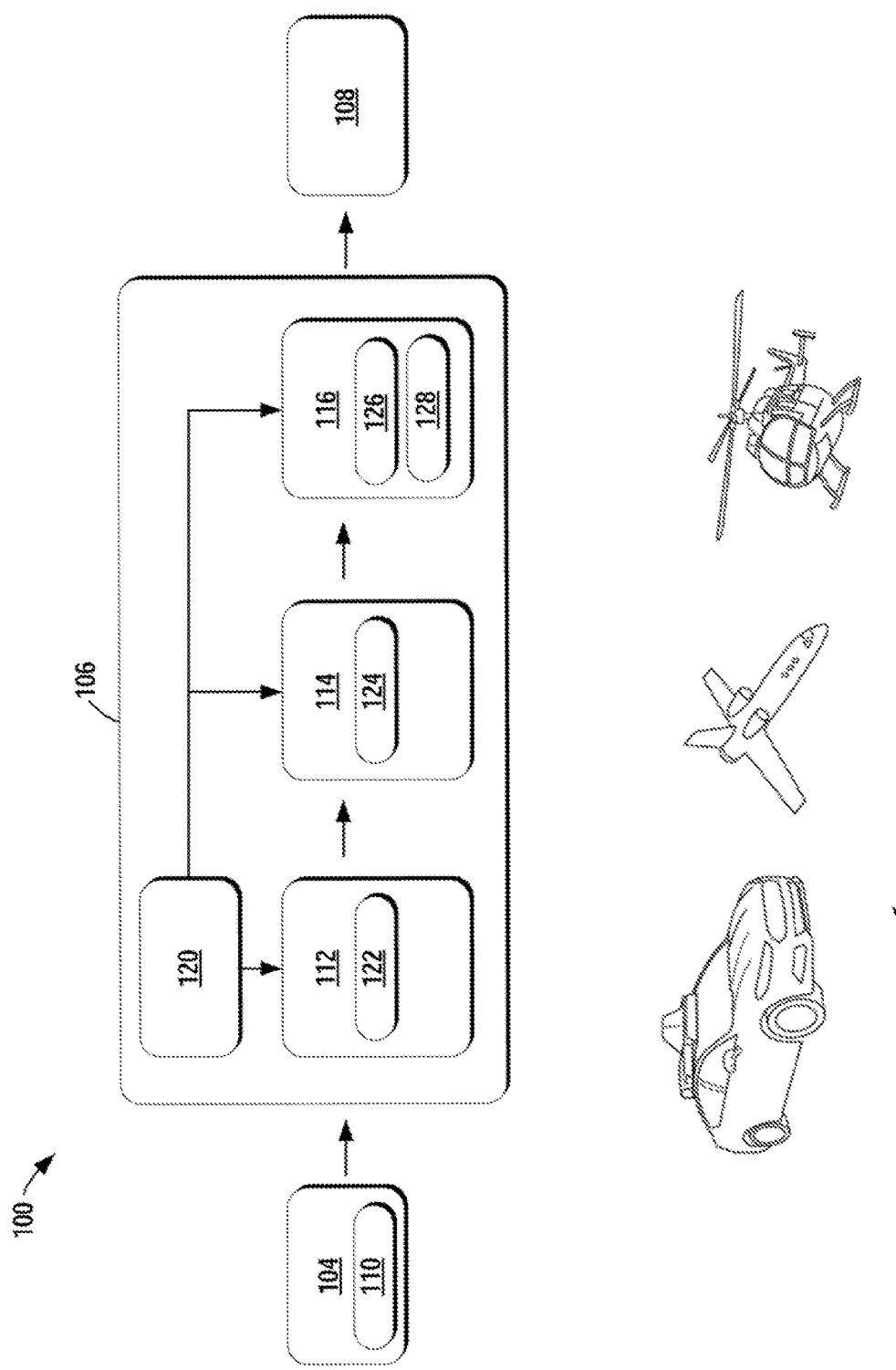
FIG. 1 depicts an example vehicle computing system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods that include and/or leverage a machine-learned model to improve motion control of an autonomous vehicle based on objects that are proximate to the autonomous vehicle. In particular, the systems and methods of the present disclosure can determine how a vehicle should react to the presence of an object (e.g. pedestrian, vehicle, bicycle, or other object) that is within proximity of the autonomous vehicle. For instance, an autonomous vehicle can acquire state data descriptive of a current state of an object that is proximate to the autonomous vehicle (e.g., within a field of view of the vehicle's data acquisition systems). The state data can be indicative of a current state of the respective object (e.g., speed, heading, current location). The autonomous vehicle can determine one or more feature(s) associated with the object based at least in part on the state data. For example, the feature(s) can include a location of the object relative to the lane markings of a travel way (e.g., road), relative to an intended travel path of the autonomous vehicle, relative to the location of the autonomous vehicle, etc. To determine how the autonomous vehicle should react to the presence of the object, the autonomous vehicle can include a machine-learned model that has been trained to determine an appropriate vehicle action based at least in part on the feature(s). For example, the machine-learned model can analyze the feature(s) associated with the object to determine if the autonomous vehicle should stop for the object or pass the object. The autonomous vehicle can plan its motion based at least in part on the determined vehicle action of the machine-learned model, for example, by iteratively determining an optimized trajectory for the autonomous vehicle to follow. The autonomous vehicle can continue this process with other objects as the vehicle travels along its desired route. In this way, the autonomous vehicle can use this iterative optimization process to improve its ability to accurately plan and control its motion with respect to surrounding objects, while increasing safety.

More particularly, an autonomous vehicle (e.g., a ground-based vehicle, air-based vehicle, other vehicle type) can include a vehicle computing system that implements a variety of systems on-board the autonomous vehicle. For instance, the vehicle computing system can include one or more data acquisition systems (e.g., sensors, image capture devices), an autonomy computing system (e.g., for determining autonomous navigation), one or more vehicle control systems (e.g., for controlling braking, steering, powertrain), etc. The data acquisition system(s) can acquire sensor data (e.g., image data, radar data, lidar data) associated with one or more objects that are proximate to the autonomous vehicle (e.g., within a field of view of one or more of the data acquisition systems). The object(s) can include, for example, pedestrians, vehicles, bicycles, and/or other objects. The objects can be located within the travel way (e.g., road) of the autonomous vehicle, traveling in an adjacent travel way (e.g., on a sidewalk, a running path), etc. The sensor data can be indicative of locations associated with the object(s) within the surrounding environment of the autonomous vehicle at one or more time(s). The data acquisition system(s) can provide such sensor data to the vehicle's autonomy computing system.

In addition to the sensor data, the autonomy computing system can retrieve or otherwise obtain map data that provides other detailed information about the surrounding environment of the autonomous vehicle. The map data can provide information regarding: the identity and location of different roadways, road segments, buildings, or other items; the location and directions of traffic lanes (e.g., the boundaries, location, direction, etc. of a parking lane, a turning lane, a bicycle lane, or other lanes within a particular travel way); traffic control data (e.g., the location and instructions of signage, traffic lights, or other traffic control devices); and/or any other map data that provides information that assists the computing system in comprehending and perceiving its surrounding environment and its relationship thereto.

The autonomy computing system can be a computing system that includes various sub-systems that cooperate to perceive the surrounding environment of the autonomous vehicle and determine a motion plan for controlling the motion of the autonomous vehicle. For instance, the autonomy system can include a perception system, a prediction system, and a motion planning system. The autonomy computing system can process the sensor data to detect the one or more object(s) that are proximate to the autonomous vehicle as well as state data associated therewith. The state data for each object can describe an estimate of the object's current location (also referred to as position), current speed/velocity, current acceleration, current heading, current orientation, size/footprint, class (e.g., pedestrian class vs. vehicle class vs. bicycle class), and/or other state information.

The autonomy computing system can determine one or more features associated with the object based at least in part on the state data. In some implementations, the autonomy computing system can determine the feature(s) based at least in part on other information, such as the acquired map data. The feature(s) can be indicative of the movement (or lack thereof) and/or position of the object relative to items within the vehicle's surroundings and/or other information associated with the object. For example, the feature(s) can include a location of the object relative to a travel way (e.g., relative to the left or right lane markings), a location of the object relative to the autonomous vehicle (e.g., a distance between the current locations of the vehicle and the object), one or more characteristic(s) of the object relative to a travel route associated with the autonomous vehicle (e.g., whether the object is moving parallel, towards, or away from the vehicle's current/future travel route or a predicted point of intersection with the vehicle's travel route), etc. In some implementations, the feature(s) determined for a particular object may depend at least in part on the class of that object. For example, the predicted path for a vehicle or bicycle traveling on a roadway may be different than that associated with a pedestrian traveling on a sidewalk.

The autonomy computing system can determine a vehicle action for the autonomous vehicle based at least in part on the feature(s) associated with object. To do so, the autonomous vehicle can include, employ, and/or otherwise leverage a model. In particular, the model can be a machine-learned model. For example, the machine-learned model can be or can otherwise include one or more various model(s) such as, for example, models using boosted random forest techniques, neural networks (e.g., deep neural networks), or other multi-layer non-linear models. Neural networks can include recurrent neural networks (e.g., long short-term memory recurrent neural networks), feed-forward neural networks, and/or other forms of neural networks. For instance, supervised training techniques can be performed to train the model (e.g., using driving log data) to determine a vehicle action based at least in part on the feature(s) associated with a an object.

The autonomy computing system can input data indicative of at least the feature(s) into the machine-learned model and receive, as an output, data indicative of a recommended vehicle action. The vehicle action can include stopping a motion of the autonomous vehicle for the object. For example, the output of the machine-learned model can indicate that the vehicle should stop for an object that is located in the center of the vehicle's current travel lane. In some implementations, the vehicle action can include queueing behind the object. For example, the output at the machine-learned model can indicate that the vehicle is to adjust its speed (e.g., to slow down) for a bicycle in the vehicle's current travel lane. In some implementations, the vehicle action can include ignoring the object. For example, the output of the machine-learned model can indicate that the vehicle is to maintain its current speed and/or trajectory, without adjusting for the object's presence (e.g., on a sidewalk). In some implementations, the vehicle action can include moving the autonomous vehicle past the object. By way of example, the output of the machine-learned model can indicate that the vehicle should pass a pedestrian that is located at the side of the vehicle's current travel lane (e.g., waiting to cross the street).

In some implementations, the autonomy computing system can determine a distance margin and/or passing speed by which the autonomous vehicle should pass the object. For instance, in some implementations, the machine-learned model can determine the distance margin and/or passing speed based at least in part on the feature(s) (e.g., the object's heading and distance from the vehicle's travel route). Additionally, or alternatively, the machine-learned model can determine a confidence score associated with the recommended vehicle action (e.g., how confident the model is in the determination to pass). The machine-learned model or another accessible model (e.g., regression model) can be trained to determine the distance margin and/or an associated passing speed based at least in part on the confidence score. For example, the output can indicate a high confidence in its determination to pass an object that is stationary on a sidewalk, away from the vehicle's path. As such, the autonomous vehicle can pass the object without increasing (or only slightly increasing) the distance between the vehicle and the object as it passes (e.g., by maintaining the current vehicle trajectory). Moreover, the autonomous vehicle can pass the object at a higher rate of speed (e.g., current speed, only slight slowing), given the high confidence score. However, in the event that an object is closer to the current travel lane of the vehicle, the autonomy computing system can determine that the vehicle should pass the object with a wider distance margin, at a lower speed.

The autonomy computing system can plan the motion of the autonomous vehicle based at least in part on the determined vehicle action and any additional parameters (e.g., distance margin, passing speed, etc.). For example, the autonomy computing system can generate cost data indicative of an effect of performing the vehicle action. The cost data can include a cost function indicative of a cost (e.g., over time) of controlling the motion of the autonomous vehicle (e.g., the trajectory, speed, or other controllable parameters of the autonomous vehicle) to perform the vehicle action (e.g., stop, pass, ignore, queue behind). The autonomy computing system can determine a motion plan for the autonomous vehicle based at least in part on the cost data. For example, the autonomy computing system can implement an optimization algorithm that considers the cost data associated with the vehicle action determined by the machine-learned model as well as other cost functions (e.g., based on speed limits, traffic lights, etc.) to determine optimized variables that make up the motion plan.

The autonomous vehicle can implement the motion plan to cause the vehicle to, for example, stop for the object, pass the object, and/or ignore the object. For example, the motion plan can include a trajectory by which the autonomous vehicle is to pass the object with at least a passing distance margin between the autonomous vehicle and the object. Moreover, the motion plan can modulate the speed of the autonomous vehicle such that the autonomous vehicle stops at a particular distance from the object or passes with caution at a lower rate of speed. In this way, the vehicle computing system can more accurately control the motion of the autonomous vehicle with respect to surrounding objects.

The systems, methods, and vehicles described herein may provide a number of technical effects and benefits. For instance, the vehicle computing system can locally (e.g., on-board the vehicle) detect an object, evaluate its features (e.g., speed, location, path) relative to the vehicle and/or the surroundings, and adjust the motion of the vehicle accordingly. By performing such an operation on-board the autonomous vehicle, the vehicle computing system can avoid the latency issues that arise by communicating with a remote computing system. The vehicle computing system can be configured to continuously perform this iterative optimization process as the vehicle travels and different objects become proximate to the autonomous vehicle. As such, the vehicle computing system can proactively control the motion of the autonomous vehicle to avoid sudden movements that place stress on the vehicle's systems and confuse or frighten users (e.g., passengers of the vehicle). Moreover, the autonomous vehicle can operate in a manner that is safer for the objects in the vehicle's surroundings.

The systems, methods, and vehicles described herein also provide an improvement to vehicle computing technology, such as autonomous vehicle computing technology. For instance, aspects of the present disclosure enable a vehicle computing system to more efficiently and accurately control the vehicle's motion. For example, the systems and methods of the present disclosure can allow one or more computing device(s) on-board an autonomous vehicle to obtain state data descriptive of a current state of an object that is proximate to the autonomous vehicle. The computing device(s) can determine one or more feature(s) associated with the object based at least in part on the state data. Moreover, the computing device(s) can determine a vehicle action for the autonomous vehicle based at least in part on a machine-learned model and the one or more feature(s) associated with the object. By utilizing the machine-learned model, the autonomous vehicle can avoid the use of a rules-based determination system, which can be less effective and flexible for vehicle action determination, as further described herein. Moreover, the machine-learned model can be more easily adjusted (e.g., via re-fined training) than a rules-based system (e.g., requiring re-written rules) as the vehicle computing system is periodically updated to calculate advanced object features. This can allow for more efficient upgrading of the vehicle computing system, leading to less vehicle downtime.

The disclosed systems, methods and vehicles have a technical effect and benefit of improved scalability by using a machine-learned model to determine vehicle actions relative to detected objects. In particular, modeling feature data and determining appropriate vehicle actions through machine-learned models greatly reduces the research time needed relative to development of hand-crafted vehicle action rules. For example, for hand-crafted vehicle action rules, a designer would need to exhaustively derive heuristic models of how different vehicles would need to react in different scenarios. It can be difficult to create hand-crafted rules that effectively address all possible scenarios that an autonomous vehicle may encounter relative to detected objects. In addition, hand-crafted rules for determining vehicle actions relative to objects may not easily scale from one location to another. For instance, how a vehicle should behave around pedestrians will likely be different in Pittsburgh, Pa. as opposed to New York City, N.Y. or in the United States versus another country. As such, it can be difficult to create effective hand-crafted rules, and even more so to create different sets of hand-crafted rules for different locations. By contrast, to use machine-learned models as described herein, a model can be trained on appropriate training data, which can be done at a massive scale if the training system permits. In addition, the machine-learned models can easily be revised as new training data is made available. As such, use of a machine-learned model trained on driving logs specific to a particular location can provide a scalable and customizable solution.

The disclosed systems, methods and vehicles have an additional technical effect and benefit of improved adaptability and opportunity to realize improvements in related autonomy systems by using a machine-learned model to determine vehicle actions relative to detected objects. An autonomy system can include numerous different components (e.g., perception, prediction, optimization, etc.) that jointly operate to determine a vehicle's motion plan. As technology improvements to one component are introduced, a machine-learned model can capitalize on those improvements to create a further refined and more accurate determination of vehicle actions relative to objects, for example, by simply retaining the existing model on new training data captured by the improved autonomy components. Such improved vehicle action determinations may be more easily recognized by a machine-learned model as opposed to hand-crafted algorithms.

The systems and methods described herein may also provide a technical effect and benefit of improved computer technology in the form of a relatively low memory usage/requirement. In particular, the machine-learned models described herein effectively summarize vehicle driving logs or other training data and compress it into compact form (e.g., the machine-learned model itself). This greatly reduces the amount of memory needed to store and implement the algorithm(s) for determining vehicle actions relative to objects within the vehicle's surroundings.

With reference now to the FIGS., example embodiments of the present disclosure will be discussed in further detail. FIG. 1 depicts an example vehicle computing system 100 of a vehicle 102 according to example embodiments of the present disclosure. The vehicle 102 incorporating the vehicle computing system 100 can be a ground-based autonomous vehicle (e.g., car, truck, bus), an air-based autonomous vehicle (e.g., airplane, drone, helicopter, or other aircraft), or other types of vehicles (e.g., watercraft). The vehicle 102 can be an autonomous vehicle that can drive, navigate, operate, etc. with minimal and/or no interaction from a human driver. For example, the vehicle 102 can be configured to operate in one or more mode(s) such as, for example, a fully autonomous operational mode and/or a semi-autonomous operational mode. A fully autonomous (e.g., self-driving) operational mode can be one in which the autonomous vehicle can provide driving and navigational operation with no interaction from a human driver. A semi-autonomous operational mode can be one in which the autonomous vehicle can operate with some interaction from a human driver present in the vehicle. In some implementations, the vehicle 102 can be associated with an entity (e.g., a service provider) that provides one or more vehicle service(s) to a plurality of users via a fleet of vehicles that includes, for example, the vehicle 102. The vehicle service(s) can include transportation services (e.g., rideshare services), courier services, delivery services, and/or other types of services.

The vehicle 102 can include one or more data acquisition systems 104, one or more computing device(s) 106, and one or more vehicle control systems 108. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The data acquisitions system(s) 104 can be configured to obtain acquire sensor data 110 associated with one or more objects that are proximate to the vehicle 102 (e.g., within a field of view of one or more of the data acquisition system(s) 104). The data acquisitions system(s) 104 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 110 can include image data, radar data, lidar data, and/or other data acquired by the data acquisitions system(s) 104. The object(s) can include, for example, pedestrians, vehicles, bicycles, and/or other objects. The object(s) can be located within the travel way (e.g., road) of the vehicle 102, traveling in an adjacent travel way (e.g., on a sidewalk, a running path), etc. The sensor data 110 can be indicative of locations associated with the object(s) within the surrounding environment of the vehicle 102 at one or more times. The data acquisition system(s) 104 can provide the sensor data 110 to the computing device(s) 106.

In addition to the sensor data 110, the computing device(s) 106 can retrieve or otherwise obtain map data 120 associated with the surroundings of the vehicle 102. The map data 120 can provide detailed information about the surrounding environment of the vehicle 102. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 102 in comprehending and perceiving its surrounding environment and its relationship thereto.

The computing device(s) 106 can be associated with and/or implement an autonomy computing system of the vehicle 102 and can assist in controlling the vehicle 102. The autonomy computing system can include a perception system 112, a prediction system 114, and a motion planning system 116 that cooperate to perceive the surrounding environment of the vehicle 102 and determine a motion plan for controlling the motion of the vehicle 102 accordingly. The computing device(s) 106 can be configured to implement these systems. For example, computing device(s) 106 can receive the sensor data 110 from the data acquisition system(s) 104, attempt to comprehend the surrounding environment by performing various processing techniques on data collected by the data acquisition system(s) 104, and generate an appropriate motion plan through such surrounding environment. The computing device(s) 106 can control the one or more vehicle control systems 108 to operate the vehicle 102 according to the motion plan.

The computing device(s) 106 can identify one or more objects that are proximate to the vehicle 102 based at least in part on the sensor data 110 and/or the map data 120. For example, the computing device(s) 106 can obtain (e.g., via the perception system 112) state data 122 descriptive of a current state of an object that is proximate to the vehicle 102. The state data for each object can describe, for example, an estimate of the object's: current location (also referred to as position); current speed (also referred to as velocity); current acceleration, current heading; current orientation; size/footprint (e.g., as represented by a bounding polygon); class (e.g., pedestrian class vs. vehicle class vs. bicycle class), and/or other state information. As described herein, an object can include a pedestrian as well as other objects such as another vehicle, a bicycle (being utilized by a human), etc.

The computing device(s) 106 can determine one or more features 124 associated with the object based at least in part on the state data 122 descriptive of the current state of the object that is proximate to the vehicle 102. The computing device(s) 106 can also, or alternatively, determine the feature(s) 124 based at least in part on other information. For example, the computing device(s) 106 can determine the one or more features 124 associated with the object based at least in part on at least one of a travel path associated with the vehicle 102 and the map data 120 (e.g., associated with surroundings of the vehicle 102), as further described herein.

In some implementations, computing device(s) 106 (e.g., the prediction system 114) can include a feature extractor that extracts the one or more features. The feature extractor included in the prediction system 114 can include computer logic utilized to provide desired functionality. The feature extractor can be implemented in hardware, firmware, and/or software controlling a general purpose processor. For example, in some implementations, the feature extractor includes program files stored on a storage device, loaded into a memory and executed by one or more processors. In other implementations, the feature extractor includes one or more sets of computer-executable instructions that are stored in a tangible computer-readable storage medium such as RAM hard disk or optical or magnetic media.

Figure 2:
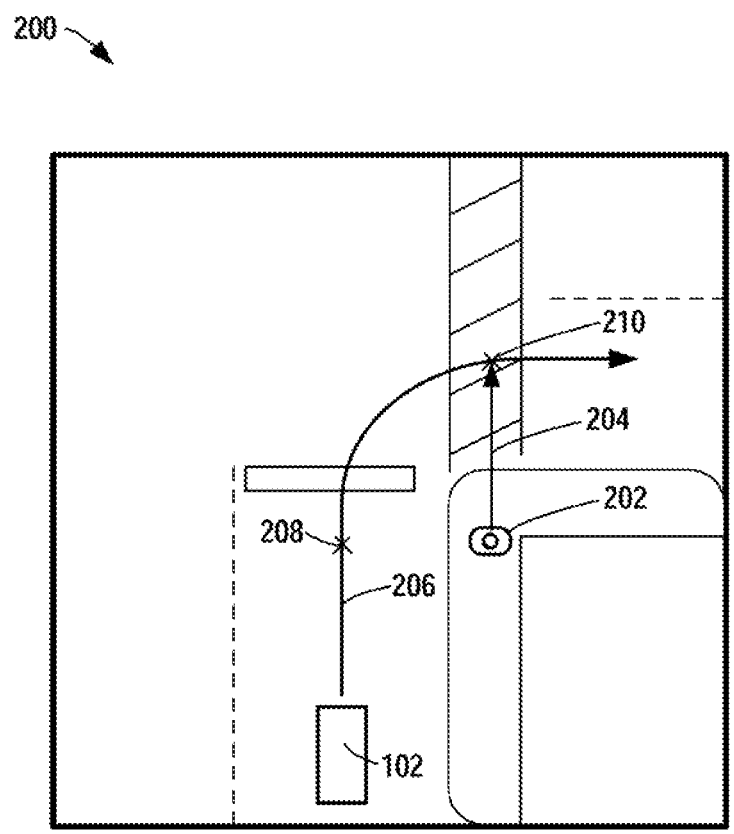
FIG. 2 depicts a graphical diagram of example vehicle surroundings according to example embodiments of the present disclosure.

The feature(s) can be indicative of the movement (or lack thereof) and/or position of the object (e.g., pedestrian, other object) relative to items within the vehicle's surroundings and/or other information associated with the object. For example, FIG. 2 depicts a graphical diagram of example vehicle surroundings 200 according to example embodiments of the present disclosure. As shown, an object 202 is proximate to the vehicle 102. The object can be, for example, a pedestrian that is traveling on a sidewalk adjacent to the vehicle's current travel way (e.g., road). An object can also be a vehicle, bicycle, and/or other object (e.g., traveling in a travel way).

In some implementations, the feature(s) 124 can include one or more general features. For example, the general features associated with the object can include a speed/velocity of the object 202, a radius/size/footprint associated with the object 202, a heading of the object 202, a speed of the vehicle 102 to which the object 202 is proximately located, etc. Additionally, or alternatively, the feature(s) 124 can include one or more predicted future locations and/or a predicted travel path 204 associated with the object 202. At least a portion of these feature(s) 124 can be determined based on the state data 122.

In some implementations, the feature(s) 124 can include one or more map-related features. For example, the features 124 associated with the object 202 can include a location of the object relative to a travel way, a distance between the object 202 from the travel way boundaries and/or markings (e.g., distance from the left and/or right lane markings, other markings), a width of the largest gap between the object and a travel way boundary, distance from a cross walk (e.g., designated by cross walk markings), etc. The map-related features can be determined based at least in part on one or more of the state data 122 and the map data 120.

In some implementations, the feature(s) 124 can include one or more vehicle-related features. The vehicle-related feature(s) can be indicative of one or more characteristics of the object 202 relative to the vehicle 102 and/or a vehicle travel route 206 (e.g., current, intended, future planned trajectory) associated with the vehicle 102. For example, the vehicle-related feature(s) can include a relative heading of the object 202 to the vehicle 102 (e.g., whether the object is moving parallel, towards, or away from the vehicle travel route 206), a distance between the object 202 and the vehicle 102, etc. In some implementations, the feature extractor can identify a point 208 on the vehicle travel route 206 that is closest to the object 202. The point 208 can be updated over time as the vehicle 102 and/or the object 202 change location. The vehicle-related feature(s) can include, for example, the distance between the object 202 and the point 208, the distance between the vehicle 102 and the point 208, the heading of the object 202 relative to the point 208, the speed of the object 202 relative to the point 208 (e.g., how fast is the object traveling towards or away from the point 208), the amount and/or percentage of braking force needed to cause the vehicle 102 to reach a stopped position before the point 208, etc. In some implementations, the feature extractor can identify a potential intersection point 210 between the vehicle 102 (e.g., based at least in part on a vehicle travel route 206 associated therewith) and the object 202 (e.g., based at least in part on a predicted location and/or predicted travel path 204 associated therewith). The vehicle-related feature(s) can include, for example, a distance between the object 202 and the potential intersection point 210, an estimated time at which the object 202 is to reach the potential intersection point 210, a distance between the vehicle 102 and the potential intersection point 210, an estimated time at which the vehicle 102 is to reach the potential intersection point 210, etc.

In some implementations, the feature(s) 124 determined for the object 202 may depend on the class of the object 202. For example, the computing device(s) 106 (e.g., the perception system 112) can select an object class for the object 202 from a plurality of candidate object classes. The plurality of candidate object classes can include at least one of a pedestrian class, a vehicle class, and a bicycle class. The computing device(s) 106 can determine the one or more features 124 associated with the object 202 based at least in part on the object class for the object 202. For example, the predicted path for a vehicle or bicycle traveling on a roadway may be different than that associated with a pedestrian traveling on a sidewalk.

Returning to FIG. 1, the computing device(s) 106 can determine a vehicle action for the vehicle 102 based at least in part on the feature(s) associated with the object 202 (e.g., pedestrian). To do so, the computing device(s) 106 can include, employ, and/or otherwise leverage a model 126. In particular, in some implementations, the model 126 can be a machine-learned model. For example, the machine-learned model can be or can otherwise include one or more various model(s) such as, for example, models utilizing boosted random forest techniques, support vector machines, neural networks (e.g., deep neural networks), or other multi-layer non-linear models. Neural networks can include recurrent neural networks (e.g., long short-term memory recurrent neural networks), feed-forward neural networks, and/or other forms of neural networks. For instance, supervised training techniques can be performed to train the model 126 (e.g., using driving log data) to determine a vehicle action based at least in part on the feature(s) 124 associated with the object 202 (e.g., pedestrian or other object), as further described herein.

Figure 3:
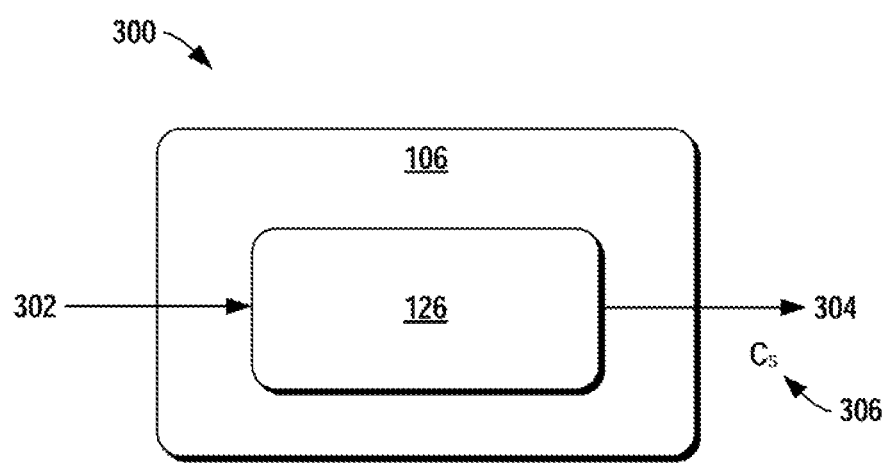
FIG. 3 depicts an example implementation of a machine-learned model according to example embodiments of the present disclosure.

FIG. 3 depicts an example implementation 300 of a machine-learned model according to example embodiments of the present disclosure. As shown, the computing device(s) 106 can provide input data 302 to the model 126. The input data 302 can include the one or more features 124 associated with the object 202. In some implementations, the input data 302 can include the map data 120. In some implementations, the input data 302 can include data associated with a vehicle travel route 206 of the vehicle 102. The model 126 can weigh the various feature(s) 124 (e.g., object location, heading, path, speed, etc. relative to the vehicle 102) to determine the appropriate action for the vehicle 102 to take with respect to the object 202. The computing device(s) 106 can receive, as an output of the model 126, data 304 indicative of the vehicle action. In some implementations, the model 126 can determine a confidence score ($C_S$) 306 associated with the outputted vehicle action (e.g., how confident the model 126 is in the determined vehicle action).

In some implementations, the output of the model 126 (and/or the associated features) for a given object (e.g., at a first time step) can be provided as an input to the model 126 for another object (e.g., at a subsequent time step). In such fashion, confidence can be built that a determined vehicle action is the most appropriate action for a given object. Stated differently, in some implementations, the process can be iterative such that confidence scores can be recalculated over time as it becomes clearer which vehicle action should be taken for an object (with certain features). For example, the model 126 can include one or more autoregressive models. In some implementations, the model 126 can include one or more machine-learned recurrent neural networks. For example, recurrent neural networks can include long short-term memory recurrent neural networks, gated recurrent unit networks, or other forms of recurrent neural networks.

Figure 4A:
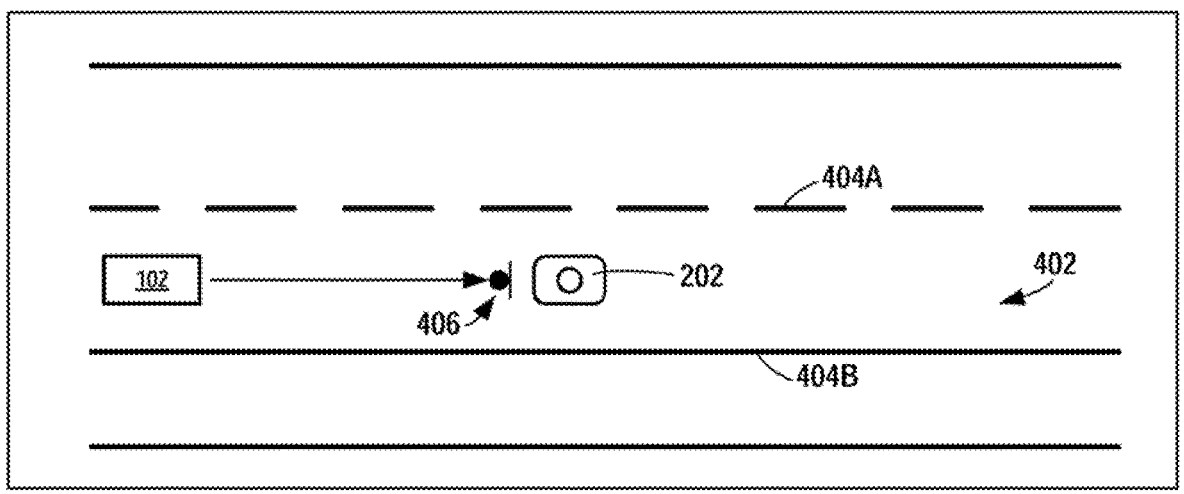
FIGS. 4A-D depict graphical diagrams of example travel ways and objects according to example embodiments of the present disclosure.

In some implementations, the vehicle action can include stopping a motion of the vehicle 102. For example, as shown in FIG. 4A, the object 202 (e.g., pedestrian) can be located and/or predicted to be located in a current travel lane 402 of the vehicle 102. The computing device(s) 106 can determine this position relative to the current travel lane 402 based at least in part on the distance between the location (or future predicted location) of the object 202 and the left or right lane boundary markings 404A-B. The model 126 can determine (e.g., based at least in part on the input data 302) that the vehicle 102 would collide with the object 202 given the vehicle's travel route and/or speed. As such, the model 126 can determine that the vehicle 102 should stop for the object 202 (e.g., decelerate to a stopped position 406). For the scenario depicted in FIG. 4A, the output of the model 126 (e.g., data 304) can indicate that the vehicle 102 should stop for the object 202 that is located in the center of the vehicle's current travel lane 402.

Figure 4B:
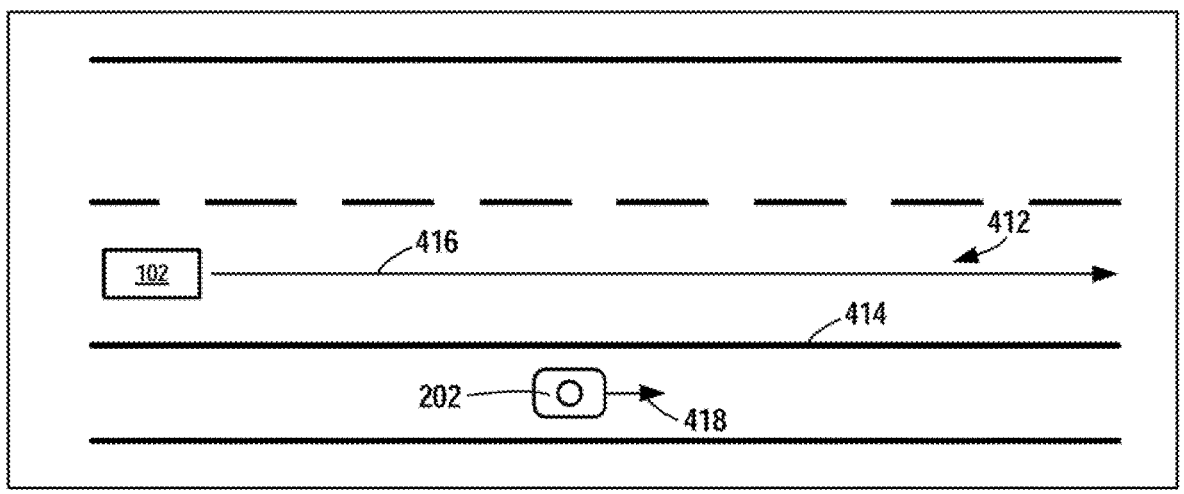

In some implementations, the vehicle action can include ignoring the object 202 when planning the motion of the vehicle 102. For example, as shown in FIG. 4B, the object 202 can be located or predicted to be located adjacent (and out of) the current travel lane 412 of the vehicle 102 (e.g., on a sidewalk or shoulder area). The computing device(s) 106 can determine this position relative to the current travel lane 412 based at least in part on the location of the object 202 relative to the right lane boundary marking 414 and the distance between the object 202 and the right lane boundary marking 414. Moreover, the model 126 can determine that the vehicle 102 would not collide (or come close to colliding) with the object 202 based at least in part on the travel route 416 of the vehicle 102, the speed of the vehicle 102, and/or the heading 418 of the object 202 (e.g., there are no predicted intersection points before the vehicle 102 would pass the object 202). Accordingly, the model 126 can determine that the vehicle 102 should ignore the object 202 (e.g., continue on its current, planned travel route). For the scenario depicted in FIG. 4B, the output of the model 126 (e.g., data 304) can indicate that the vehicle 102 need not make any motion adjustments based on the object's presence (e.g., on the sidewalk, shoulder).

Figure 4C:
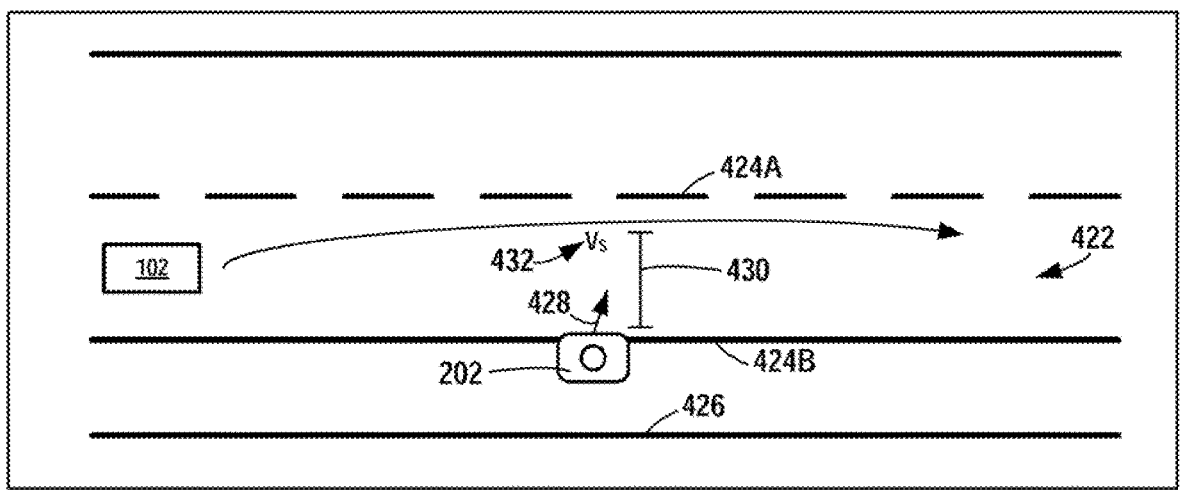
Figure 4D:
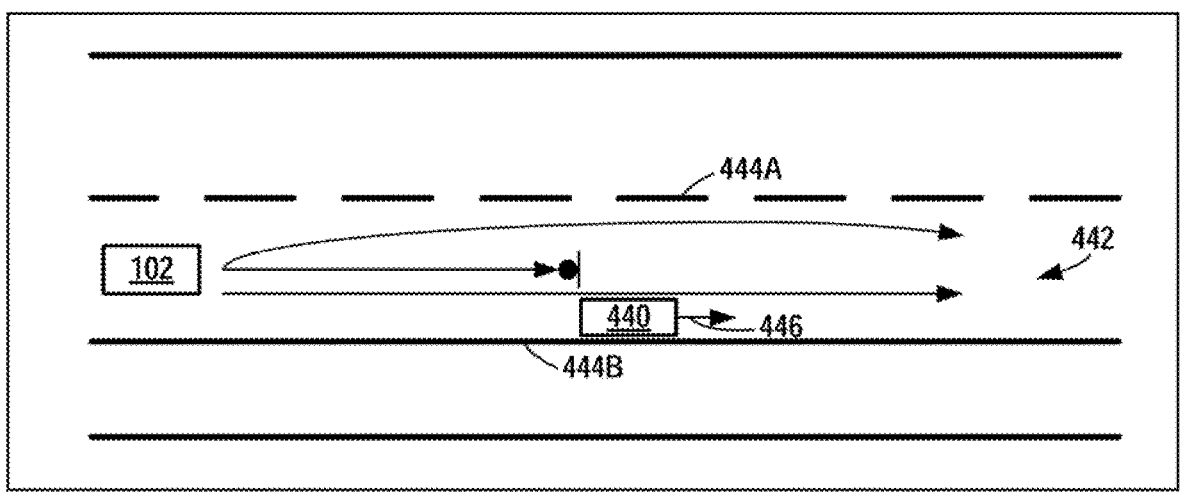

In some implementations, the vehicle action can include moving the vehicle 102 past the object 202. For example, as shown in FIG. 4C, the object 202 can be located at the side of the vehicle's current travel lane 422 (e.g., waiting to cross the street). The computing device(s) 106 can determine this position relative to the current travel lane 422 based at least in part on the location of the object 202 relative to the left and right lane boundary markings 424A-B and the distance between the object 202 and the right lane boundary marking 424B. Additionally, and/or alternatively, the model 126 can determine this position relative to the current travel lane 422 based at least in part on the location of the object 202 relative to another geographic feature that is not associated with the current travel lane, such as a wall 426 (e.g., retaining wall). In some implementations, the heading 428 (and speed) of the object 202 can indicate that the object 202 is traveling towards the travel route of the vehicle 102 and/or into the current travel lane 422. The model 126 can determine that the vehicle 102 would come close to colliding with the object 202 (e.g., come within a threshold distance of the object 202) or that the vehicle 101 would collide with the object 202 based at least in part on one or more of the location of the object 202, the heading 428 of the object, the speed of the object 202, the travel route of the vehicle 102, the speed of the vehicle 102, and/or other features. Accordingly, the model 126 can determine that the vehicle 102 should move past the object 202 by, for example, adjusting the trajectory, speed, heading, etc. of the vehicle 102. For the scenario depicted in FIG. 4C, the output of the model 126 (e.g., data 304) can indicate that the vehicle 102 should move past the object 202 that is located at the side of the vehicle's current travel lane 422.

The computing device(s) 106 can determine a passing distance margin 430 and/or a passing speed ($V_S$) 432 by which the vehicle 102 should pass the object 202. The model 126 or another accessible model (e.g., binary logistic regression model, a multinomial logistic regression model) can be trained to determine the passing distance margin 430 and/or passing speed 432. In some implementations, the model 126 (and/or another model) can determine the passing distance margin 430 and/or passing speed 432 based at least in part on the feature(s) 124. For example, in the event that the model 126 determines that the object 202 will be closer to the center of the current travel lane 422 when the vehicle 102 approaches (e.g., based on the pedestrian's heading, speed, distance from lane boundary markings), the model 126 can determine that the vehicle 102 should pass the object 202 with a wider distance margin (e.g., within the travel lane 422), at a lower rate of passing speed 432.

In some implementations, the computing device(s) 106 (e.g., using the model 126 and/or another model) can determine the passing distance margin 430 and/or the passing speed 432 based at least in part on the confidence score 306 associated with the vehicle action. For example, the confidence score 306 can indicate a high confidence in the model's determination to pass an object 202 that is stationary on a sidewalk, away from the travel route of the vehicle 102. As such, the computing device(s) 106 can determine that the vehicle 102 can pass the object 202 without increasing (or only slightly increasing) the passing distance margin 430 between the vehicle 102 and the object 202. Moreover, the computing device(s) 106 can determine that the vehicle 102 can pass the object at a higher rate of passing speed 432 (e.g., current speed, only slight slowing), given the higher confidence score. However, in the event that the object 202 is closer to the center of current travel lane 422 of the vehicle 102, the computing device(s) 106 can determine that the vehicle 102 should pass the object 202 with a wider passing distance margin 430 (e.g., within the travel lane 422), at a lower passing speed 432.

FIG. 4B depicts another example diagram of an example travel way according to example embodiments of the present disclosure. As shown, the object 440 can be located within a travel lane 442 of the vehicle 102. The computing device(s) 106 can determine this position based at least in part on the location of the object 440 relative to one or more lane boundary markings 444A-B. The object 440 can be static or non-static, and can be a vehicle, a bicycle, and/or other object. In some implementations, the object 440 can be associated with a predicted path 446. In some implementations, the model 126 can determine that the vehicle 102 should pass the object 440 (e.g., a parked vehicle, slowly moving bicycle in the bicycle lane). In some implementations, the model 126 can determine that the vehicle 102 should stop for the object 440 and/or queue behind the object 440 for travel. In some implementations, the model 126 can determine that the vehicle 102 should ignore the object 440 when controlling vehicle motion. In this way, the model 126 can help to plan the motion of the vehicle 102 with respect to objects other than pedestrians.

Returning to FIG. 1, the computing device(s) 106 can be configured to plan the motion of the vehicle 102 based at least in part on the determined vehicle action and, if any, the additional parameters (e.g., distance margin, passing speed, etc.) determined by the model 126. For example, the computing device(s) 106 can generate cost data indicative of an effect of performing the vehicle action. The cost data can include a cost function indicative of a cost (e.g., over time) of controlling the motion of the vehicle 102 (e.g., the trajectory, speed, or other controllable parameters of the vehicle 102) to perform the vehicle action (e.g., stop, pass, ignore). For example, the cost described by a cost function can increase when the vehicle 102 would strike another object, deviate from a preferred pathway (e.g., run off of the road), etc.

The computing device(s) 106 can determine a motion plan 128 for the vehicle 102 based at least in part on the cost data. For instance, the computing device(s) 106 (e.g., the motion planning system 116) can implement an optimization algorithm that considers the cost data associated with the vehicle action determined by the model 126 as well as other cost functions (e.g., based on speed limits, traffic lights, etc.), if any, to determine optimized variables that make up the motion plan 128. By way of example, the model 126 can also determine that the vehicle 102 can pass the object 202 without increasing the potential risk to the vehicle 102 and/or violating any traffic laws (e.g., speed limits, lane boundaries, signage). For example, the model 126 can determine that the vehicle 102 has enough room in its current lane or can change lanes to pass the object 202 without greatly increasing the risk to the vehicle, violating any traffic laws, and/or striking another object.

The computing device(s) 106 can provide data indicative of the motion plan 128 to the one or more vehicle control systems 108 to implement the motion plan 128 for the vehicle 102 to cause the vehicle 102 to perform the vehicle action. For instance, the vehicle 102 can include a mobility controller configured to translate the motion plan into instructions. By way of example, the mobility controller can translate a determined motion plan into instructions to adjust the steering of the vehicle 102 "X" degrees, apply 10% braking force, etc. The mobility controller can send one or more control signals to the vehicle control components (e.g., braking control component, steering control component) to execute the instructions and implement the motion plan.

For instance, the vehicle 102 can implement the motion plan 128 to cause the vehicle 102 to stop for the object 202, queue behind the object 202, ignore the object 202, or pass the object 202. By way of example, the motion plan 128 can include a trajectory by which the vehicle 102 is to pass the object 202 with at least a passing distance margin 430 between the vehicle 102 and the object 202. Moreover, the motion plan 128 can modulate the speed of the vehicle 102 such that the vehicle 102 stops at a particular location and/or distance from the object 202 or passes with caution at a lower rate of passing speed 432. In this way, the computing device(s) 106 can more accurately control the motion of the vehicle 102 with respect to a surrounding object 202.

Figure 5:
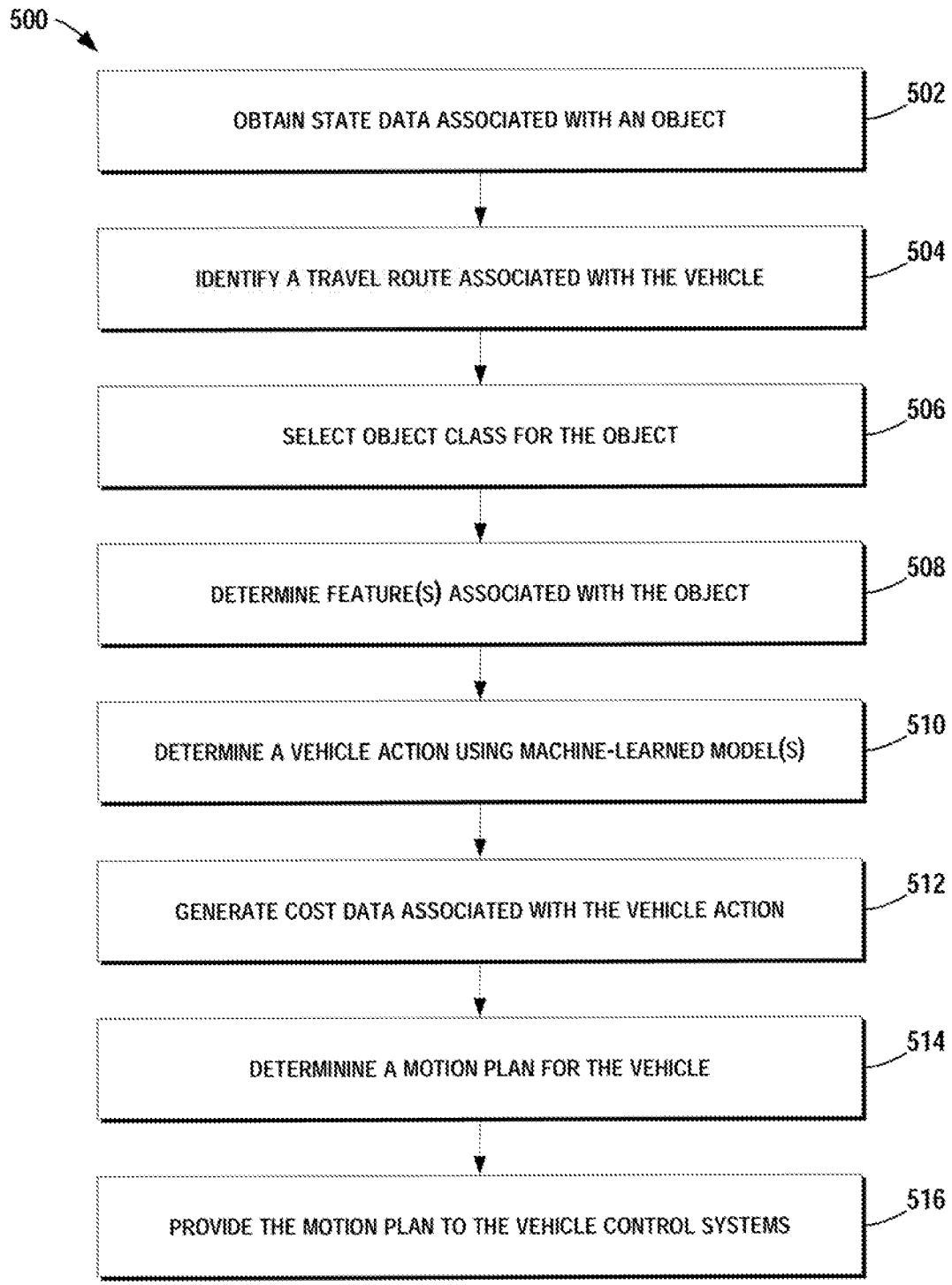
FIG. 5 depicts a flow diagram of an example method of controlling the motion of a vehicle according to example embodiments of the present disclosure.

FIG. 5 depicts a flow diagram of an example method 500 of controlling the motion of an autonomous vehicle according to example embodiments of the present disclosure. One or more portion(s) of the method 500 can be implemented by one or more computing devices such as, for example, the computing device(s) 106 of FIG. 1. Moreover, one or more portion(s) of the method 500 can be implemented as an algorithm on the hardware components of the device(s) described herein (e.g., as in FIGS. 1 and 6) to, for example, control the motion of a vehicle. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 500 can include obtaining state data associated with an object. For instance, the computing device(s) 106 (e.g., the perception system 112) on-board the vehicle 102 can obtain state data 122 descriptive of a current state of an object 202 that is proximate to the vehicle 102. As described herein, the state data 122 can describe an estimated current location of the object 202 (also referred to as position), current speed/velocity, current acceleration, current heading, current orientation, size/footprint, class (e.g., pedestrian class vs. vehicle class vs. bicycle class), and/or other state information. The computing device(s) 106 can also obtain map data 120, as described herein.

At (504), the method 500 can include identifying a travel route associated with the vehicle. For instance, the computing device(s) 106 can identify a travel route (e.g., vehicle travel route 206) and/or speed associated with the vehicle 102. The travel route can be a current, planned, and/or intended trajectory of the vehicle 102. The travel route can be provided via a computing system that is remote from the vehicle 102 and/or determined on-board the vehicle 102.

At (506), the method 500 can include selecting an object class for the object. For instance, the computing device(s) 106 can select an object class for the object 202 that is proximate to the vehicle 102 from a plurality of candidate object classes. As described herein, the plurality of candidate object classes can include at least a pedestrian class and a vehicle class. By way of example, the computing device(s) 106 can select a pedestrian class for a pedestrian that is detected to be proximate to the vehicle 102.

At (508), the method 500 can include determining one or more features associated with the object. For instance, the computing device(s) 106 can determine one or more features 124 associated with the object 202 based at least in part on the state data 122. Additionally, or alternatively, the computing device(s) 106 can determine the one or more features associated with the object based at least in part on one or more of the map data 120 (e.g., associated with surroundings of the vehicle 102), the object class for the object 202, and a travel route associated with the vehicle 102. As described herein, the feature(s) 124 can include, for example, one or more of: a speed of the object, a location of the object relative to a travel way, a location of the object relative to the vehicle, and one or more characteristics of the object relative to a travel route associated with the vehicle.

At (510), the method 500 can include determining a vehicle action using a machine-learned model. The computing device(s) 106 can determine a vehicle action for the vehicle 102 based at least in part on the model 126 (e.g., a machine-learned model) and the one or more features 124 associated with the object 202. For instance, the computing device(s) 106 can obtain data descriptive of the model 126. The computing device(s) 106 can input the one or more features 124 associated with the object into the model 126 (e.g., as input data 302). The computing device(s) 106 can receive data 304 indicative of the vehicle action as an output of the model 126. In some implementations, the computing device(s) 106 can determine a confidence score 306 associated with the vehicle action (e.g., received as an output of the model 126). The vehicle action can include stopping a motion of the vehicle 102, moving the vehicle 102 past the object 202, or ignoring the object 202 when planning the motion of the vehicle 102. In the event that vehicle action indicates that the vehicle 102 is to pass the object 202, in some implementations, the computing device(s) 106 can determine a passing distance margin based at least in part on the confidence score 306 associated with the vehicle action, as described herein.

At (512), the method 500 can include generating cost data associated with the vehicle action. For example, the vehicle action can include stopping the motion of the vehicle 102. The computing device(s) 106 can generate cost data indicative of an effect of stopping the motion of the vehicle 102. The cost data can include a cost function that is indicative of a cost of stopping the motion of the vehicle 102. The computing device(s) 106 can determine a motion plan 128 for the vehicle 102 based at least in part on the cost data, at (514). The computing device(s) 106 can provide data indicative of the motion plan 128 to one or more vehicle control systems 108 to implement the motion plan 128 for the vehicle 102, at (516). Implementation of the motion plan 128 (e.g., via application of a braking force by a braking component) can cause the vehicle 102 to decelerate to a stopped position.

In another example, the vehicle action can include moving the vehicle 102 past the object 202 (e.g., passing a pedestrian). The computing device(s) 106 can generate cost data indicative of an effect of moving the vehicle 102 past the object 202, at (512). The cost data can include a cost function that is indicative of a cost of moving the vehicle 102 past the object 202. The computing device(s) 106 can determine a motion plan 128 for the vehicle 102 based at least in part on the cost data, at (514). The computing device(s) 106 can provide data indicative of the motion plan 128 to one or more vehicle control systems 108 to implement the motion plan 128 for the vehicle 102, at (516). Implementation of the motion plan 128 (e.g., via adjustment of the vehicle heading by a steering component, application of a braking force by a braking component) can cause the vehicle 102 to move past the object 202 with a passing distance margin 430 between the vehicle 102 and the object 202 (and/or at a passing speed 432).

Figure 6:
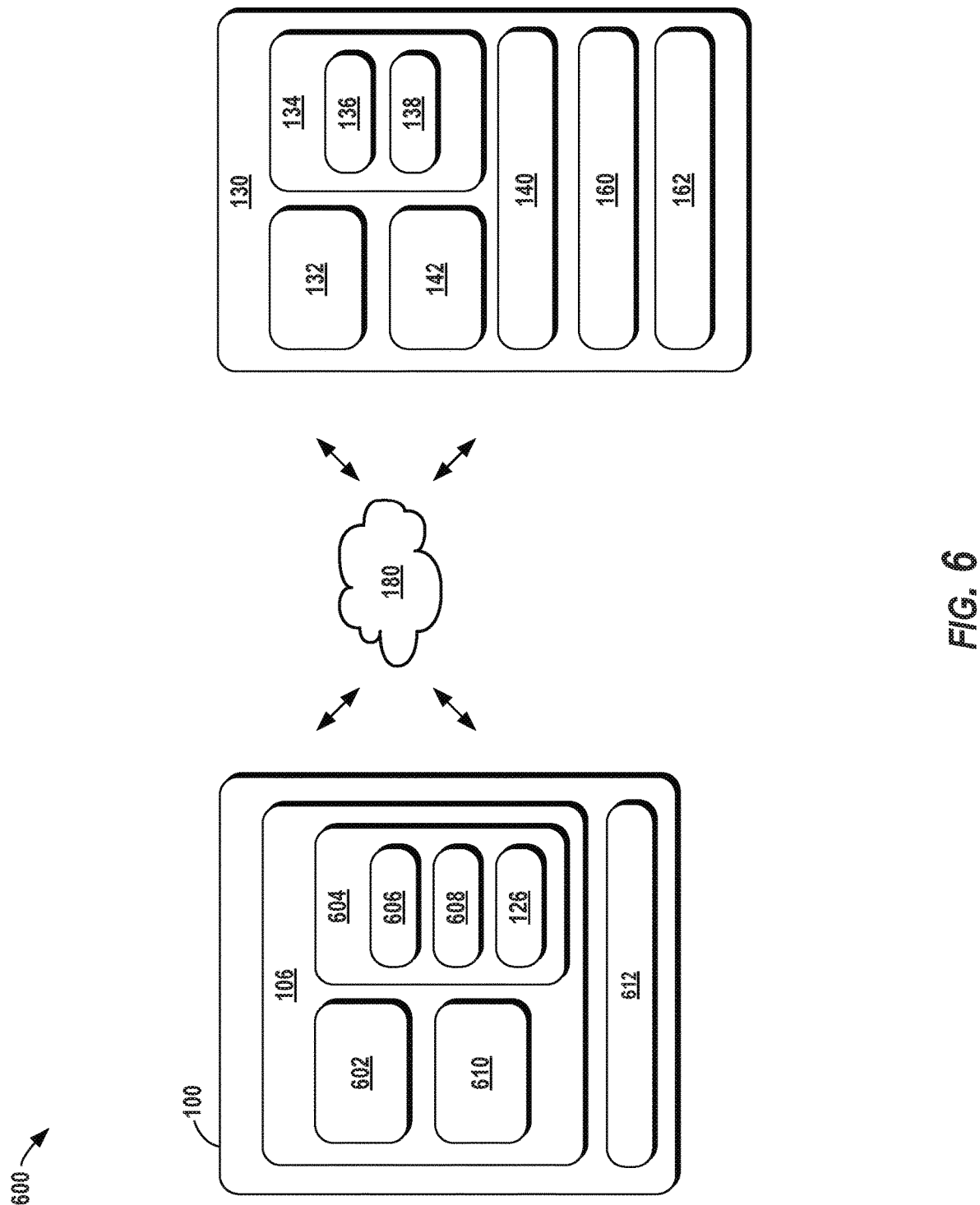
FIG. 6 depicts example computing system according to example embodiments of the present disclosure.

FIG. 6 depicts an example computing system 600 according to example embodiments of the present disclosure. The example system 600 includes a vehicle computing system 100 and a machine learning computing system 130 that are communicatively coupled over one or more networks 180. The example computing system 600 illustrated in FIG. 6 is provided as an example only. The components, systems, connections, and/or other aspects illustrated in FIG. 6 are optional and are provided as examples of what is possible, but not required, to implement the present disclosure.

The computing device(s) 106 of the vehicle computing system 100 can include one or more processors 602 and a memory 604. The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, etc., and combinations thereof.

The memory 604 can store information that can be accessed by the one or more processors 602. For instance, the memory 604 (e.g., one or more non-transitory computer-readable storage mediums, memory devices) on-board the vehicle 102 can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 on-board the vehicle 102 can store instructions 606 that when executed by the one or more processors 602 on-board the vehicle 102 cause the one or more processors 602 (the vehicle computing system 100) to perform operations such as any of the operations and functions of the computing device(s) 106 or for which the computing device(s) 106 are configured, as described herein, the operations for controlling the motion of an autonomous vehicle (e.g., one or more portions of method 500), and/or any other operations or functions for controlling the motion of an autonomous vehicle, as described herein.

The memory 604 can store data 608 that can be retrieved, written, manipulated, created, and/or stored. The data 608 can include, for instance, sensor data, state data, data indicative of one or more features, model input data, model output data, cost data, data indicative of a motion plan, and/or other data or information as described herein. The data 608 can be stored in one or more memory devices. The one or more memory devices can be split up so that they are located in multiple locales on-board the vehicle 102. In some implementations, the computing device(s) 106 can obtain data from one or more memory device(s) that are remote from the vehicle 102.

The computing device(s) 106 can also include a communication interface 610 used to communicate with one or more systems or devices, including one or more systems or devices on-board the vehicle 102 and/or that are remotely located from the vehicle 102. The communication interface 610 can include any circuits, components, software, etc. for communicating with one or more networks (e.g., 180). In some implementations, the communication interface 610 can include, for example, one or more of a communications controller, receiver, transceiver, transmitter, port, conductors, software and/or hardware for communicating data.

In some implementations, vehicle computing system 100 can further include a positioning system 612. The positioning system 612 can determine a current position of the vehicle 102. The positioning system 612 can be any device or circuitry for analyzing the position of the vehicle 102. For example, the positioning system 612 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 102 can be used by various systems of the vehicle computing system 100.

According to an aspect of the present disclosure, the vehicle computing system 100 can store or include one or more models 126. As examples, the models 126 can be or can otherwise include various machine-learned models such as, for example, models utilizing boosted random forest techniques, support vector machines, neural networks (e.g., deep neural networks), or other multi-layer non-linear models. Example neural networks include feed-forward neural networks, recurrent neural networks (e.g., long short-term memory recurrent neural networks), convolutional neural networks, or other forms of neural networks.

In some implementations, the vehicle computing system 100 can obtain the one or more models 126 from the machine learning computing system 130 over network(s) 180 and can store the one or more models 126 in the memory 604. The vehicle computing system 100 can then use or otherwise implement the one or more models 126 (e.g., by processor(s) 602). As described herein, the one or more models 126 can include a machine-learned model that has been trained to determine a vehicle action based at least in part on one or more features associated with an object that is proximate to the vehicle 102. In some implementations, the vehicle computing system 100 can implement multiple parallel instances of a single model (e.g., to perform parallel vehicle action determinations across multiple instances of proximate objects and/or multiple determinations for a single object).

The machine learning computing system 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be received, accessed, written, manipulated, created, and/or stored. In some implementations, the machine learning computing system 130 can obtain data from one or more memories that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132. For example, the memory 134 can store instructions 138 that when executed by the one or more processors 132 cause the one or more processors 132 to perform any of the operations and/or functions described herein, including, for example, the operations and functions of the machine learning computing system 130, as described herein.

In some implementations, the machine learning computing system 130 can include one or more server computing devices. If the machine learning computing system 130 can include multiple server computing devices, such server computing devices can operate according to various computing architectures, including, for example, sequential computing architectures, parallel computing architectures, or some combination thereof.

The machine learning computing system 130 can include one or more machine-learned models 140. As examples, the machine-learned models 140 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 130 can communicate with the vehicle computing system 100 according to a client-server relationship. For example, the machine learning computing system 130 can implement the machine-learned models 140 to provide a web service to the computing system 102 (e.g., an autonomous vehicle motion planning service).

Thus, machine-learned models 110 can located and used at the vehicle computing system 100 and/or machine-learned models 140 can be located and used at the machine learning computing system 130.

In some implementations, the machine learning computing system 130 and/or the vehicle computing system 100 can train the machine-learned models 110 and/or 140 through use of a model trainer 160. The model trainer 160 can be implemented in hardware, firmware, and/or software controlling one or more processors. The model trainer 160 can train the machine-learned models 110 and/or 140 using one or more training or learning algorithms. One example training technique is backwards propagation of errors. In some implementations, the model trainer 160 can perform supervised training techniques using a set of labeled training data. In other implementations, the model trainer 160 can perform unsupervised training techniques using a set of unlabeled training data. The model trainer 160 can perform a number of generalization techniques to improve the generalization capability of the models being trained. Generalization techniques include weight decays, dropouts, or other techniques.

In particular, the model trainer 160 can train a machine-learned model 110 and/or 140 based on a set of training data 162. The training data 162 can include, for example, a number of sets of ground-truth data obtained from previously observed driving logs. In some implementations, driving logs used to create training data 162 can be taken from the same geographic area (e.g., city, state, and/or country) in which an autonomous vehicle utilizing that model 126/140 is designed to operate. In this way, model 126/140 can be trained to determine vehicle actions in a manner that is tailored to the driving customs of a particular location (e.g., by providing pedestrians more right of way in some locations than others.)

In some implementations, training data 162 can include a first portion of data corresponding to data recorded and/or determined during previously observed driving sessions of the autonomous vehicle. Such first portion of data can include, for example, one or more features 124 associated with an object 202, map data 120, and/or data associated with a vehicle travel route 206 of the vehicle 102. Training data 126 can further include a second portion of data corresponding to labels of "correct" vehicle actions for one or more objects (e.g., pedestrians, vehicles, bicycles, or other objects). The second portion of data can be labeled manually, automatically or using a combination of automatic labeling and manual labeling.

In some implementations, to train the model 126/140, training computing system 150 can input a first portion of a set of ground-truth data into the model to be trained. In response to receipt of such first portion, the model 126/140 outputs one or more vehicle actions that predict the remainder of the set of ground-truth data (e.g., the second portion of data). After such prediction, the training computing system 150 can apply or otherwise determine a loss function that compares the one or more vehicle actions output by the model 126/140 to the remainder of the ground-truth data (e.g., the second portion of data) which the model attempted to predict. The training computing system 150 then can backpropagate the loss function through the model 126/140 to train the model (e.g., by modifying one or more weights associated with the model).

The machine learning computing system 130 can also include a communication interface 142 used to communicate with one or more systems or devices, including systems or devices that are remotely located from the machine learning computing system 130. The communication interface 142 can include any circuits, components, software, etc. for communicating with one or more networks (e.g., 180). In some implementations, the communication interface 142 can include, for example, one or more of a communications controller, receiver, transceiver, transmitter, port, conductors, software and/or hardware for communicating data.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 6 illustrates one example computing system 600 that can be used to implement the present disclosure. Other computing systems can be used as well. For example, in some implementations, the vehicle computing system 100 can include the model trainer 160 and the training dataset 162. In such implementations, the machine-learned models 126 can be both trained and used locally at the vehicle computing system 100. As another example, in some implementations, the vehicle computing system 100 may not be connected to other computing systems.

In addition, components illustrated and/or discussed as being included in one of the computing systems 100 or 130 can instead be included in another of the computing systems 100 or 130. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel. Furthermore, computing tasks discussed herein as being performed at computing device(s) remote from the vehicle can instead be performed at the vehicle (e.g., via the vehicle computing system), or vice versa. Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of controlling the motion of an autonomous vehicle, comprising:

obtaining, by a computing system comprising one or more computing devices on-board an autonomous vehicle, state data descriptive of a current state of an object that is proximate to the autonomous vehicle;

determining, by the computing system, one or more features associated with the object based at least in part on the state data;

determining, by the computing system using a machine-learned model and based at least in part on the one or more features associated with the object, whether to stop a motion of the autonomous vehicle or move the autonomous vehicle past the object and a confidence score that describes a confidence of the machine-learned model with respect to the determination of whether to stop the motion of the autonomous vehicle or move the autonomous vehicle past the object, wherein the determination is output by the machine-learned model, and wherein the confidence score is output by the machine-learned model;

selecting, by the computing system, an object class for the object from a plurality of candidate object classes, the plurality of candidate object classes comprising at least a pedestrian class and a vehicle class; and determining, by the computing system and an additional model that is distinct from the machine-learned model, at least one of a passing distance margin or a passing speed based at least in part on the object class of the object and the confidence score that describes the confidence of the machine-learned model with respect to the determination of whether to stop the motion of the autonomous vehicle or move the autonomous vehicle past the object.

2. The computer-implemented method of claim 1, wherein determining whether to stop the motion of the autonomous vehicle or move the autonomous vehicle past the object and the confidence score associated with the determination comprises:

obtaining, by the computing system, data descriptive of the machine-learned model;

inputting, by the computing system, the one or more features associated with the object into the machine-learned model; and receiving, by the computing system, data indicative of the determination of whether to stop a motion of the autonomous vehicle or move the autonomous vehicle past the object comprises and the confidence score that describes the confidence of the machine-learned model with respect to the determination of whether to stop a motion of the autonomous vehicle or move the autonomous vehicle past the object comprises as an output of the machine-learned model.

3. The computer-implemented method of claim 1, wherein the determination of whether to stop a motion of the autonomous vehicle or move the autonomous vehicle past the object comprises stopping the motion of the autonomous vehicle, and wherein the method further comprises:

generating, by the computing system, cost data indicative of an effect of stopping the motion of the autonomous vehicle.

4. The computer-implemented method of claim 3, wherein the cost data comprises a cost function that is indicative of a cost of stopping the motion of the autonomous vehicle.

5. The computer-implemented method of claim 3, further comprising:

determining, by the computing system, a motion plan for the autonomous vehicle based at least in part on the cost data; and providing, by the computing system, data indicative of the motion plan to one or more vehicle control systems to implement the motion plan for the autonomous vehicle.

6. The computer-implemented method of claim 5, wherein implementation of the motion plan causes the autonomous vehicle to decelerate to a stopped position.

7. The computer-implemented method of claim 1, further comprising:

identifying, by the computing system, a travel route associated with the autonomous vehicle; and determining, by the computing system, the one or more features associated with the object based at least in part on the travel route associated with the autonomous vehicle.

8. The computer-implemented method of claim 1, wherein the one or more features comprise one or more of: a speed of the object, a location of the object relative to a travel way, a location of the object relative to the autonomous vehicle, and one or more characteristics of the object relative to a travel route associated with the autonomous vehicle.

9. The computer-implemented method of claim 1, wherein the determination of whether to stop a motion of the autonomous vehicle or move the autonomous vehicle past the object comprises moving the autonomous vehicle past the object, and wherein the method further comprises:

generating, by the computing system, cost data indicative of an effect of moving the autonomous vehicle past the object.

10. The computer-implemented method of claim 9, wherein the cost data comprises a cost function that is indicative of a cost of moving the autonomous vehicle past the object.

11. The computer-implemented method of claim 9, further comprising:

determining, by the computing system, a motion plan for the autonomous vehicle based at least in part on the cost data; and providing, by the computing system, data indicative of the motion plan to one or more vehicle control systems to implement the motion plan for the autonomous vehicle, wherein implementation of the motion plan causes the autonomous vehicle to move past the object with the passing distance margin between the autonomous vehicle and the object.

12. The computer-implemented method of claim 1, wherein the additional model comprises at least one of a binary logistic regression model or a multinomial logistic regression model.

13. A computing system for controlling the motion of an autonomous vehicle, comprising:

one or more processors on-board an autonomous vehicle; and one or more memory devices on-board the autonomous vehicle, the one or more memory devices storing instructions that when executed by the one or more processors cause the computing system to perform operations, the operations comprising:

obtaining state data descriptive of a current state of an object that is proximate to the autonomous vehicle;

determining one or more features associated with the object based at least in part on the state data;

inputting the one or more features associated with the object into a machine-learned model;

receiving, as an output of the machine-learned model, data indicative of a determination of whether to stop a motion of the autonomous vehicle or move the autonomous vehicle past the object and a confidence score that describes a confidence of the machine-learned model with respect to the determination of whether to stop the motion of the autonomous vehicle or move the autonomous vehicle past the object;

selecting an object class for the object from a plurality of candidate object classes, the plurality of candidate object classes comprising at least a pedestrian class and a vehicle class; and determining, by an additional model, at least one of a passing distance margin or a passing speed based at least in part on the object class of the object and the confidence score that describes the confidence of the machine-learned model with respect to the determination of whether to stop the motion of the autonomous vehicle or move the autonomous vehicle past the object.

14. The computing system of claim 13, wherein the determination of whether to stop a motion of the autonomous vehicle or move the autonomous vehicle past the object comprises moving the autonomous vehicle past the object and ignoring the object when planning the motion of the autonomous vehicle.

15. The computing system of claim 13, wherein determining the one or more features associated with the object based at least in part on the state data further comprises:

determining the one or more features associated with the object based at least in part on the object class for the object.

16. An autonomous vehicle, comprising:

a machine-learned model that has been trained to determine whether to stop a motion of the autonomous vehicle or move the autonomous vehicle past an object and a confidence score that describes a confidence of the machine-learned model with respect to the determination of whether to stop the motion of the autonomous vehicle or move the autonomous vehicle past the object based at least in part on one or more features associated with the object that is proximate to the autonomous vehicle;

one or more processors; and one or more non-transitory computer-readable media that collectively store instructions that, when executed by the one or more processors, cause the one or more processors to perform operations, the operations comprising:

obtaining state data descriptive of a current state of the object that is proximate to the autonomous vehicle;

determining the one or more features associated with the object based at least in part on the state data descriptive of the current state of the object that is proximate to the autonomous vehicle;

inputting the one or more features associated with the object into the machine-learned model;

receiving, as an output of the machine-learned model, data indicative of the determination of whether to stop a motion of the autonomous vehicle or move the autonomous vehicle past the object and a confidence score that describes a confidence of the machine-learned model with respect to the determination of whether to stop the motion of the autonomous vehicle or move the autonomous vehicle past the object; and determining, by an additional model, at least one of a passing distance margin or a passing speed based at least in part on the confidence score that describes the confidence of the machine-learned model with respect to the determination of whether to stop a motion of the autonomous vehicle or move the autonomous vehicle past the object.

17. The autonomous vehicle of claim 16, wherein the operations further comprise:

generating cost data indicative of an effect of stopping the motion of the autonomous vehicle or moving the autonomous vehicle past the object;

determining a motion plan for the autonomous vehicle based at least in part on the cost data; and providing data indicative of the motion plan to one or more vehicle control systems to implement the motion plan for the autonomous vehicle to stop the motion of the autonomous vehicle or move the autonomous vehicle past the object.

18. The autonomous vehicle of claim 16, wherein the determination of whether to stop a motion of the autonomous vehicle or move the autonomous vehicle past the object comprises moving the autonomous vehicle past the object and ignoring the object when planning the motion of the autonomous vehicle.

19. The autonomous vehicle of claim 16, wherein determining the one or more features associated with the object further comprises:

determining the one or more features associated with the object based at least in part on at least one of a travel path associated with the autonomous vehicle and map data associated with the surroundings of the autonomous vehicle.

20. The autonomous vehicle of claim 16, wherein the additional model comprises at least one of a binary logistic regression model or a multinomial logistic regression model.

* * * * *